(12) United States Patent
Kageyama et al.

(10) Patent No.: US 10,246,526 B2
(45) Date of Patent: Apr. 2, 2019

(54) VULCANIZED RUBBER COMPOSITION AND PRODUCTION METHOD THEREOF

(71) Applicant: MITSUBISHI GAS CHEMICAL COMPANY, INC., Tokyo (JP)

(72) Inventors: Takuya Kageyama, Tokyo (JP); Takashi Sugimoto, Tokyo (JP); Susumu Innan, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 15/777,008

(22) PCT Filed: Aug. 10, 2017

(86) PCT No.: PCT/JP2017/029072
§ 371 (c)(1),
(2) Date: May 17, 2018

(87) PCT Pub. No.: WO2018/043088
PCT Pub. Date: Mar. 8, 2018

(65) Prior Publication Data
US 2018/0355074 A1 Dec. 13, 2018

(30) Foreign Application Priority Data

Sep. 2, 2016 (JP) ................................. 2016-172020

(51) Int. Cl.
| | | |
|---|---|---|
| C08C 19/25 | (2006.01) | |
| C08C 19/22 | (2006.01) | |
| C08J 3/20 | (2006.01) | |
| C08K 5/31 | (2006.01) | |
| C08K 5/548 | (2006.01) | |
| C08L 7/00 | (2006.01) | |
| C08L 9/00 | (2006.01) | |
| B60C 1/00 | (2006.01) | |
| C08K 3/36 | (2006.01) | |

(52) U.S. Cl.
CPC ............ *C08C 19/25* (2013.01); *B60C 1/0016* (2013.01); *C08C 19/22* (2013.01); *C08J 3/20* (2013.01); *C08J 3/203* (2013.01); *C08K 3/36* (2013.01); *C08K 5/31* (2013.01); *C08K 5/548* (2013.01); *C08L 7/00* (2013.01); *C08L 9/00* (2013.01); *C08J 2309/06* (2013.01); *Y02T 10/862* (2013.01)

(58) Field of Classification Search
CPC ........ C08C 19/25; B60C 1/0016; C08J 3/203; C08J 2309/06; C08K 3/36; C08K 5/31; C08K 5/548

USPC ......................................................... 524/195
See application file for complete search history.

(56) References Cited

U.S. PATENT DOCUMENTS

| | | |
|---|---|---|
| 2003/0134947 A1 | 7/2003 | Nohara et al. |
| 2010/0105805 A1 | 4/2010 | Sasaka |
| 2013/0018141 A1* | 1/2013 | Oda .......................... B29B 7/18 524/526 |
| 2013/0296463 A1 | 11/2013 | Katou et al. |
| 2016/0145418 A1* | 5/2016 | Agoretti .................. C08J 3/215 525/102 |
| 2017/0121429 A1 | 5/2017 | Iwata et al. |
| 2017/0129850 A1 | 5/2017 | Iwata et al. |
| 2017/0260302 A1 | 9/2017 | Iwata et al. |

FOREIGN PATENT DOCUMENTS

| | | |
|---|---|---|
| JP | 2001-139728 A | 5/2001 |
| JP | 2010-209225 A | 9/2010 |
| JP | 2010209255 A | 9/2010 |
| JP | 2012-092271 A | 5/2012 |
| JP | 2013-100425 A | 5/2013 |
| JP | 2015-098608 A | 5/2015 |
| JP | 2015-117323 | 6/2015 |
| WO | 2008/123306 A | 10/2008 |
| WO | 2015/093391 A | 6/2015 |
| WO | 2015/190504 A | 12/2015 |
| WO | 2015/190519 A | 12/2015 |
| WO | 2016/039276 A | 3/2016 |

OTHER PUBLICATIONS

International Search Report with English Translation in respect to International Application No. PCT/JP2017/029072, dated Oct. 10, 2017.

(Continued)

*Primary Examiner* — Hui H Chin
(74) *Attorney, Agent, or Firm* — Greenblum & Bernstein, P.L.C.

(57) ABSTRACT

Provided is a method for producing a vulcanized rubber composition, including: a first kneading step of obtaining a kneaded mixture comprising a rubber component comprising at least one selected from the group consisting of natural rubbers and synthetic rubbers, a filler comprising an inorganic filler, and a sulfur-containing silane coupling agent; a second kneading step of adding sulfur and a vulcanization accelerator to the kneaded mixture, followed by kneading, to thereby obtain an unvulcanized rubber composition; and a vulcanization step of vulcanizing the unvulcanized rubber composition to thereby obtain a vulcanized rubber composition having a glass transition temperature of −30° C. to 0° C. by; wherein specific aminoguanidines are added, followed by kneading, in the first kneading step.

10 Claims, No Drawings

(56) References Cited

OTHER PUBLICATIONS

Japanese Patent Office Decision to Grant a Patent in Application No. 2017-567821 dated Mar. 15, 2018.
Claims from Japanese Application No. 2017-567821 as allowed, and an English Translation thereof, which is identical to the claims filed in the present Application on May 16, 2018 prior to entry of the Preliminary Amendment.

* cited by examiner

VULCANIZED RUBBER COMPOSITION AND PRODUCTION METHOD THEREOF

TECHNICAL FIELD

The present invention relates to a vulcanized rubber composition and a production method thereof.

BACKGROUND ART

Rubber compositions containing guanidine compounds for applications other than vulcanization accelerators are conventionally known, including rubber compositions disclosed in Patent Literatures 1 to 3. Patent Literature 1 proposes a rubber composition containing: 100 parts by weight of a rubber component composed of at least one selected from the group consisting of natural rubbers and synthetic rubbers; and 0.05 to 20 parts by weight of at least one selected from compounds (A) having specific structures, for the purpose of providing a rubber composition having excellent heat aging resistance without reducing the rubber properties, and discloses a guanidine compound such as aminoguanidine as one of the compounds (A).

Further, Patent Literature 2 proposes a rubber composition containing a natural rubber and an aminoguanidine compound, for the purpose of providing a rubber composition containing a natural rubber having significantly reduced odors, while solving the problem of storage curing and achieving a stabilized viscosity over a long period of time, and also the purpose of providing a method for stabilizing the viscosity and reducing odors of the natural rubber.

Further, Patent Literature 3 proposes a production method involving compounding diphenylguanidine in the master batch-kneading step of kneading a rubber component, silica, and the silane coupling agent to improve the abrasion resistance while enhancing the reaction rate of silica with a silane coupling agent.

CITATION LIST

Patent Documents

Patent Document 1: Japanese Patent Application Laid-Open No. 2001-139728
Patent Document 2: International Publication No. 2015/093391
Patent Document 3: International Publication No. 2008/123306

SUMMARY OF INVENTION

Technical Problem

Conventionally, it is known that, for example, an inorganic filler such as silica or a silane coupling agent is added to a rubber composition used for tires so as to satisfy various requirements. In order to use the rubber composition to which such a material is added for tires, both the rolling resistance and the wet grip performance are required to be further enhanced. In order to satisfy such requirements, it is necessary to enhance the loss tangent at 0° C. of the rubber composition so as to increase the wet grip performance and reduce the loss tangent at 60° C. so as to reduce the rolling resistance.

The present invention has been made in view of such circumstances described above, and an object thereof is to provide a method for producing a vulcanized rubber composition that contains a natural rubber and/or a synthetic rubber, an inorganic filler, and a silane coupling agent, the method being capable of reducing the loss tangent at 60° C. while enhancing the loss tangent at 0° C., and to provide the vulcanized rubber composition.

Solution to Problem

The inventors have made diligent studies in order to achieve the aforementioned object. Specifically, as a result of detailed studies on the loss tangent at 0° C. and 60° C. of the vulcanized rubber composition, it has been found that the loss tangent at 0° C. and 60° C. can be controlled by adding a specific compound to a vulcanized rubber composition having another property within a specific range, thereby accomplishing the present invention.

The present invention is as follows.

[1]

A method for producing a vulcanized rubber composition, comprising:

a first kneading step of obtaining a kneaded mixture comprising a rubber component comprising at least one selected from the group consisting of natural rubbers and synthetic rubbers, a filler comprising an inorganic filler, and a sulfur-containing silane coupling agent;

a second kneading step of adding sulfur and a vulcanization accelerator to the kneaded mixture, followed by kneading, to thereby obtain an unvulcanized rubber composition; and a vulcanization step of vulcanizing the unvulcanized rubber composition to thereby obtain a vulcanized rubber composition having a glass transition temperature of −30° C. to 0° C., wherein at least one selected from the group consisting of compounds represented by formulae (1), (2), and (3) below is added, followed by kneading, in the first kneading step:

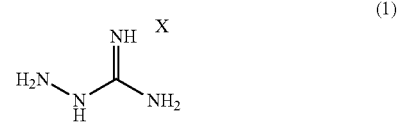

(1)

wherein X is an acid that forms a salt together with a guanidine moiety;

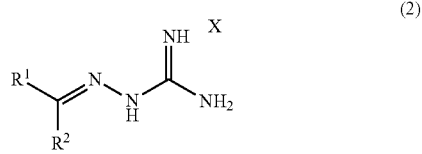

(2)

wherein X is an acid that forms a salt together with a guanidine moiety, $R^1$ and $R^2$ are each independently any one selected from the group consisting of a hydrogen atom and an alkyl group, a cycloalkyl group, an aryl group, an alkyl aryl group, and an alkenyl group which have 1 to 18 carbon atoms, these groups each optionally having one or more substituents containing at least one selected from the group consisting of a sulfur atom, a nitrogen atom, and an oxygen atom; and

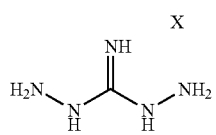

wherein X is an acid that forms a salt together with a guanidine moiety.

[2]
The method for producing a vulcanized rubber composition according to [1], wherein
the inorganic filler comprises silica.

[3]
The method for producing a vulcanized rubber composition according to [1] or [2], wherein
the maximum temperature in a kneader used for obtaining the kneaded mixture in the first kneading step is 120° C. to 190° C.

[4]
The method for producing a vulcanized rubber composition according to any one of [1] to [3], wherein
the temperature in the kneader used for obtaining the kneaded mixture when adding the at least one selected from the group consisting of the compounds represented by formulae (1), (2), and (3) above in the first kneading step is 120° C. or less.

[5]
A vulcanized rubber composition comprising:
a rubber component comprising at least one selected from the group consisting of natural rubbers and synthetic rubbers;
an inorganic filler;
a sulfur-containing silane coupling agent;
at least one selected from the group consisting of compounds represented by formulae (1), (2), and (3) below;
sulfur; and
a vulcanization accelerator;
wherein the vulcanized rubber composition has a glass transition temperature of −30° C. or more and 0° C. or less:

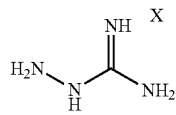

wherein X is an acid that forms a salt together with a guanidine moiety;

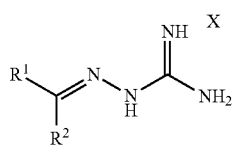

wherein X is an acid that forms a salt together with a guanidine moiety, $R^1$ and $R^2$ are each independently any one selected from the group consisting of a hydrogen atom and an alkyl group, a cycloalkyl group, an aryl group, an alkyl aryl group, and an alkenyl group which have 1 to 18 carbon atoms, these groups each optionally having one or more substituents containing at least one selected from the group consisting of a sulfur atom, a nitrogen atom, and an oxygen atom; and

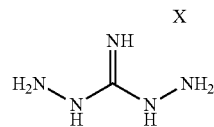

wherein X is an acid that forms a salt together with a guanidine moiety.

[6]
The vulcanized rubber composition according to [5], wherein
the inorganic filler comprises silica.

Advantageous Effects of Invention

The present invention can provide: a method for producing a vulcanized rubber composition that contains a natural rubber and/or a synthetic rubber, an inorganic filler, and a silane coupling agent, the method being capable of reducing the loss tangent at 60° C. while enhancing the loss tangent at 0° C.; and the vulcanized rubber composition.

DESCRIPTION OF EMBODIMENTS

Hereinafter, an embodiment for carrying out the present invention (hereinafter simply referred to as "this embodiment") will be described in detail, but the present invention is not limited to the following embodiment. Various modifications can be made without departing from the gist of the present invention.

The method for producing a vulcanized rubber of this embodiment has: a first kneading step of obtaining a kneaded mixture containing a rubber component including at least one selected from the group consisting of natural rubbers and synthetic rubbers, a filler including an inorganic filler, and a sulfur-containing silane coupling agent; a second kneading step of adding sulfur and a vulcanization accelerator to the kneaded mixture, followed by kneading, to thereby obtain an unvulcanized rubber composition; and a vulcanization step of vulcanizing the unvulcanized rubber composition to thereby obtain a vulcanized rubber composition having a glass transition temperature of −30° C. or more and 0° C. or less, wherein at least one selected from the group consisting of compounds represented by formulae (1), (2), and (3) below (which will be hereinafter referred to also as "aminoguanidines") is added, followed by kneading, in the first kneading step:

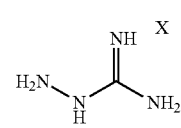

wherein X is an acid that forms a salt together with a guanidine moiety;

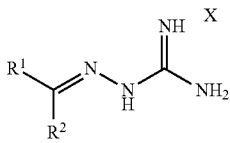

(2)

wherein X is an acid that forms a salt together with a guanidine moiety, $R^1$ and $R^2$ are each independently any one selected from the group consisting of an alkyl group, a cycloalkyl group, an aryl group, an alkyl aryl group, and an alkenyl group which have 1 to 18 carbon atoms, and a hydrogen atom; and any one of the aforementioned groups may have one or more substituents containing at least one selected from the group consisting of a sulfur atom, a nitrogen atom, and an oxygen atom; and

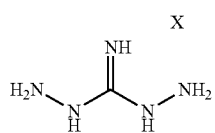

(3)

wherein X is an acid that forms a salt together with a guanidine moiety.

Further, the vulcanized rubber composition of this embodiment, which can be obtained by the aforementioned production method, contains: a rubber component including at least one selected from the group consisting of natural rubbers and synthetic rubbers; an inorganic filler; a sulfur-containing silane coupling agent; at least one selected from the group consisting of compounds represented by formulae (1), (2), and (3) above; sulfur; and a vulcanization accelerator; wherein the vulcanized rubber composition has a glass transition temperature of −30° C. or more and 0° C. or less.

In the first kneading step, a kneaded mixture is obtained by kneading a rubber component including at least one selected from the group consisting of natural rubbers and synthetic rubbers, a filler containing an inorganic filler, a sulfur-containing silane coupling agent, and at least one selected from the group consisting of the compounds represented by formulae (1), (2), and (3) above.

In this embodiment, any one of natural rubbers, synthetic rubbers, and both of them can be used. The natural rubbers are not specifically limited, and rubbers having any shapes such as sheet rubbers or block rubbers obtained by coagulating natural rubber latex, followed by drying, can be used as raw materials. The sheet rubbers are not specifically limited, and examples thereof include a ribbed smoked sheet (RSS) obtained by drying a sheet, while smoking the sheet; an air dried sheet (ADS) obtained by drying a sheet with hot air; and a crepe obtained by sufficiently washing a coagulate with water, followed by drying with hot air; these being classified according to the rating of "International Standards of Quality and Packing for Natural Rubber Grades" (commonly known as the Green Book). Other examples of the sheet rubber include TC rubber (Technically Classified Rubber), SP rubber (Super Processing Rubber), MG rubber, PP crepe, a softener and peptizer-added rubber. The block rubbers are not specifically limited, and examples thereof include SMR (Standard Malaysian Rubber) from Malaysia, SIR from Indonesia, TTR from Thai, SCR from Sri Lanka, and SSR from Singapore. These natural rubber raw materials may be used singly, or in combinations of two or more thereof.

Further, a rubber obtained by oxidizing natural rubber latex followed by coagulation may be used as a natural rubber. The natural rubber latex can be oxidized by a known method. For example, according to the disclosure of Japanese Patent Application Laid-open No. 8-81505, natural rubber latex dissolved in an organic solvent at a ratio of 1.0 mass % or more and 30 mass % or less can be oxidized with air in the presence of a metal oxidation catalyst. Further, as disclosed in Japanese Patent Application Laid-open No. 9-136903, natural rubber latex can be oxidized also by adding a carbonyl compound to the natural rubber latex. In the case of oxidation with air, as disclosed in Japanese Patent Application Laid-open No. 9-136903, the oxidation may be carried out in the presence of a radical generator in order to promote the air oxidation. The radical generator is not specifically limited, and at least one selected from the group consisting of peroxide radical generators, redox radical generators, and azo radical generators is suitably used therefor.

The synthetic rubbers are not specifically limited, and examples thereof include diene rubbers having a double bond in the molecule such as 1,4-polybutadiene, 1,2-polybutadiene, 1,4-polyisoprene, 3,4-polyisoprene, styrene butadiene rubber, terminal-modified styrene butadiene rubber, chloroprene rubber, nitrile rubber, ethylene propylene rubber, and ethylene propylene diene rubber. In order to exert the operational effects by the present invention more effectively and reliably, the synthetic rubbers preferably include at least one selected from the group consisting of styrene butadiene rubber and terminal-modified styrene butadiene rubber. The synthetic rubbers may be synthesized by a conventional method, or a commercially available product may be used. The synthetic rubbers may be used singly, or in combinations of two or more thereof.

The material of the inorganic filler in this embodiment is an inorganic compound including at least one selected from the group consisting of silicon, oxides or hydroxides of typical metals or transition metals and hydrates thereof, and carbonates or silicates of typical metals or transition metals.

Specifically, the inorganic filler is not specifically limited, as long as it is an inorganic filler used in the art. The carbon black, which will be described below, is not included in the inorganic filler described herein and does not fall within the inorganic filler. Inorganic fillers are roughly classified into reinforcing fillers such as silica whose surface may be active and surface-treated clay, and non-reinforcing fillers such as calcium carbonate, clay, and talc. Specific examples of the inorganic filler include oxides such as silica, aluminum oxide, and zinc oxide (zinc flower); carbonates such as calcium carbonate and magnesium carbonate; hydroxides such as aluminum hydroxide; and silicates such as aluminum silicate (clay), magnesium silicate (talc), and calcium silicate. In consideration of interaction with modified rubbers, the inorganic filler is preferably a reinforcing filler, more preferably silica. The silica is not specifically limited, and wet silica (hydrous silicic acid) and dry silica (anhydrous silicic acid) can be used, for example. Further, the zinc flower can function also as a vulcanization accelerator aid. The inorganic fillers may be used singly, or in combinations of two or more thereof.

When silica is used as the inorganic filler, the BET specific surface area thereof is preferably 40 $m^2$/g or more and 350 $m^2$/g or less. When the BET specific surface area of silica falls within this range, the particle size of silica falls within a more appropriate range. As a result, the tensile strength of the vulcanized rubber composition tends to be improved, and the hysteresis loss tends to be reduced. The BET specific surface area can be measured according to JIS Z8830:2013.

As the filler used in the production method of this embodiment, carbon black can be used in addition to the aforementioned inorganic filler, in order to enhance the reinforcing effect. The carbon black is a filler different from the inorganic filler and is clearly distinguished from the inorganic filler. The carbon black is not specifically limited, and examples thereof include carbon black of various grades such as GPF, FEF, SRF, HAF, ISAF, and SAF.

The total amount of the inorganic filler and the carbon black used in the production method of this embodiment is not specifically limited. However, in order to obtain the effect of enhancing the loss tangent at 0° C., the effect of reducing the loss tangent at 60° C., and the reinforcing effect, without deteriorating the workability, the total content is preferably in the range of 5.0 parts by mass or more and 100 parts by mass or less, more preferably in the range of 20 parts by mass or more and 80 parts by mass or less, further preferably in the range of 50 parts by mass or more and 80 parts by mass or less, based on 100 parts by mass of the rubber component.

The sulfur-containing silane coupling agent of this embodiment is not specifically limited, as long as it is a silane coupling agent having a sulfur atom in the molecule. In order to exert the operational effects by the present invention more effectively and reliably, the sulfur-containing silane coupling agent is preferably at least one selected from the group consisting of polysulfide silane coupling agents and thioester silane coupling agents. Examples of such a silane coupling agent include compounds represented by formulae (14a) and (14b) below:

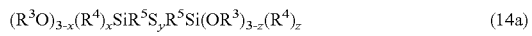
$$(R^3O)_{3-x}(R^4)_xSiR^5S_yR^5Si(OR^3)_{3-z}(R^4)_z \quad (14a)$$

wherein each $R^3$ may be the same as or different from the other and is a linear, cyclic, or branched alkyl group having 1 to 8 carbon atoms or a linear or branched alkoxy alkyl group having 2 to 8 carbon atoms; each $R^4$ may be the same as or different from the other and is a linear, cyclic, or branched alkyl group having 1 to 8 carbon atoms; each $R^5$ may be the same as or different from the other and is a linear or branched alkylene group having 1 to 8 carbon atoms; y is 2 to 6 as an average; and each of x and z may be the same as or different from the other and is 0 to 3 as an average, except for the case where both of x and z are 3; and

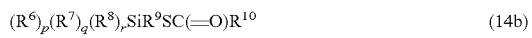
$$(R^6)_p(R^7)_q(R^8)_rSiR^9SC(=O)R^{10} \quad (14b)$$

wherein $R^6$ is a monovalent group selected from —Cl, —Br, $R^{11}O—$, $R^{11}C(=O)O—$, $R^{11}R^{12}C=NO—$, $R^{11}R^{12}CNO—$, $R^{11}R^{12}N—$, and $—(OSiR^{11}R^{12})_h(OSiR^{11}R^{12}R^{13})$, wherein each of $R^{11}$, $R^{12}$, and $R^{13}$ may be the same as or different from the others and is a hydrogen atom or a monovalent hydrocarbon group having 1 to 18 carbon atoms, and h is 1 to 4 as an average; $R^7$ is $R^6$, a hydrogen atom, or a monovalent hydrocarbon group having 1 to 18 carbon atoms; $R^8$ is $R^6$, $R^7$, a hydrogen atom, or $—[O(R^{14}O)_j]_{0.5}—$, wherein $R^{14}$ is an alkylene group having 1 to 18 carbon atoms, and j is an integer of 1 to 4; $R^9$ is a divalent hydrocarbon group having 1 to 18 carbon atoms; $R^{10}$ is a monovalent hydrocarbon group having 1 to 18 carbon atoms; and p, q, and r are numbers that satisfy the relationship of p+q+2r=3, 0≤p≤3, 0≤q≤2, and 0≤r≤1.

More specifically, examples of such a silane coupling agent include bis(3-triethoxysilylpropyl) tetrasulfide, bis(3-trimethoxysilylpropyl) tetrasulfide, bis(3-methyldimethoxysilylpropyl) tetrasulfide, bis(2-triethoxysilylethyl) tetrasulfide, bis(3-triethoxysilylpropyl) disulfide, bis(3-trimethoxysilylpropyl) disulfide, bis(3-triethoxysilylpropyl) trisulfide, 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, 2-lauroylthioethyltrimethoxysilane, 3-mercaptopropyltrimethoxysilane, 3-mercaptopropyltriethoxysilane, 3-mercaptopropylmethyldimethoxysilane, 3-triethoxysilylpropyl-N,N-dimethylthiocarbamoyl tetrasulfide, 3-triethoxysilylpropylbenzothiazolyl tetrasulfide, 3-triethoxysilylpropylmethacryloyl monosulfide, 3-trimethoxysilylpropyl-N,N-dimethylthiocarbamoyl tetrasulfide, 3-trimethoxysilylpropylbenzothiazolyl tetrasulfide, 3-trimethoxysilylpropylmethacryloyl monosulfide, bis(3-monoethoxydimethylsilylpropyl) disulfide, bis(3-monomethoxydimethylsilylpropyl) tetrasulfide, bis(3-monomethoxydimethylsilylpropyl) trisulfide, bis(3-monomethoxydimethylsilylpropyl) disulfide, bis(2-monoethoxydimethylsilylethyl) tetrasulfide, bis(2-monoethoxydimethylsilylethyl) trisulfide, bis(2-monoethoxydimethylsilylethyl) disulfide, bis(3-monoethoxydimethylsilylpropyl) tetrasulfide, bis(3-trimethoxysilylpropyl) trisulfide, bis(3-methyldimethoxysilylpropyl) trisulfide, bis(2-triethoxysilylethyl) trisulfide, bis(3-monoethoxydimethylsilylpropyl) trisulfide, and bis(2-triethoxysilylethyl) disulfide. Among these, in order to exert the operational effects by the present invention more effectively and reliably, a compound represented by formula (14a) above is preferable, and bis(3-triethoxysilylpropyl) tetrasulfide, bis(3-trimethoxysilylpropyl) tetrasulfide, bis(3-methyldimethoxysilylpropyl) tetrasulfide, bis(2-triethoxysilylethyl) tetrasulfide, bis(3-triethoxysilylpropyl) disulfide, bis(3-trimethoxysilylpropyl) disulfide, bis(3-triethoxysilylpropyl) trisulfide, bis(3-monoethoxydimethylsilylpropyl) disulfide, bis(3-monomethoxydimethylsilylpropyl) tetrasulfide, bis(3-monomethoxydimethylsilylpropyl) trisulfide, bis(3-monomethoxydimethylsilylpropyl) disulfide, bis(2-monoethoxydimethylsilylethyl) tetrasulfide, bis(2-monoethoxydimethylsilylethyl) trisulfide, bis(2-monoethoxydimethylsilylethyl) disulfide, bis(3-monoethoxydimethylsilylpropyl) tetrasulfide, bis(3-trimethoxysilylpropyl) trisulfide, bis(3-methyldimethoxysilylpropyl) trisulfide, bis(2-triethoxysilylethyl) trisulfide, bis(3-monoethoxydimethylsilylpropyl) trisulfide, and bis(2-triethoxysilylethyl) disulfide are more preferable.

In order to exert the operational effects by the present invention more effectively and reliably, the amount of the sulfur-containing silane coupling agent used is preferably 1 part by mass or more and 20 parts by mass or less, more preferably 3 parts by mass or more and 15 parts by mass or less, further preferably 5 parts by mass or more and 10 parts by mass or less, based on 100 parts by mass of the inorganic filler. The sulfur-containing silane coupling agents may be used singly, or in combinations of two or more thereof.

Examples of the aminoguanidines include at least one selected from the group consisting of the compounds represented by formulae (1), (2), and (3) above. X in formula (1) above is an acid that can form a salt together with a guanidine moiety, and the types thereof are not limited. Examples thereof include organic acids (such as acetic acid, oxalic acid, and p-toluenesulfonic acid) and inorganic acids (such as hydrogen chloride, hydrogen bromide, hydrogen iodide, nitric acid, sulfuric acid, phosphoric acid, carbonic acid, sulfamic acid, perchloric acid, silicic acid, boric acid, and phenyl phosphinic acid). The acids may be used singly, or in combinations of two or more thereof.

The compound represented by formula (1) above has strong basicity, since positive charges of conjugate acids are stabilized by dispersion due to a plurality of nitrogen atoms present in the molecule, and the compound is normally present as a composite (salt) with an acid. Examples of the compound represented by formula (1) above include aminoguanidine carbonate (melting point: 162° C. (decomposition)), aminoguanidine hydrochloride (melting point: 165° C.), aminoguanidine hydroiodide (melting point: 115° C. to 118° C.), aminoguanidine hydrobromide, aminoguanidine hemisulfate (melting point: 207° C.), aminoguanidine nitrate (melting point: 145° C. to 147° C.), aminoguanidine oxalate (melting point: 209° C.) aminoguanidine phosphate (melting point: 144° C.), aminoguanidine acetate, aminoguanidine sulfamate, aminoguanidine perchlorate, aminoguanidine silicate, aminoguanidine borate, and aminoguanidine phenylphosphinate. Among these, in order to exert the operational effects by the present invention more effectively and reliably, aminoguanidine carbonate, aminoguanidine hydrochloride, aminoguanidine phosphate, and aminoguanidine acetate are preferable, and aminoguanidine carbonate is more preferable.

The compound represented by formula (1) above can be obtained by a known method, or a commercially available product may be used.

X in formula (2) above is an acid that can form a salt together with a guanidine moiety, and the types thereof are not limited. Examples of the acid that can form a salt together with a guanidine moiety include organic acids such as acetic acid, oxalic acid, and phenyl phosphinic acid; and inorganic acids such as hydrochloric acid, sulfuric acid, carbonic acid, nitric acid, phosphoric acid, hydrobromic acid, hydriodic acid, hydrobromic acid, sulfamic acid, perchloric acid, silicic acid, and boric acid. Among these, hydrochloric acid, sulfuric acid, carbonic acid, and nitric acid, with which guanidine salts as raw material compounds are easily commercial available, are preferable, and carbonic acid is more preferable because of the ease of purification during production. The acids may be used singly, or in combinations of two or more thereof.

$R^1$ and $R^2$ are each independently any one or more selected from the group consisting of an alkyl group having 1 to 18 carbon atoms, a cycloalkyl group having 1 to 18 carbon atoms, an aryl group having 1 to 18 carbon atoms, an alkyl aryl group having 1 to 18 carbon atoms, an alkenyl group having 1 to 18 carbon atoms, and a hydrogen atom. The aforementioned groups may have one or more substituents containing at least one selected from the group consisting of a sulfur atom, a nitrogen atom, and an oxygen atom. Among these, each of $R^1$ and $R^2$ is preferably a hydrogen atom, an alkyl group having 1 to 5 carbon atoms, or an alkenyl group having 1 to 5 carbon atoms, more preferably an alkyl group having 1 to 5 carbon atoms or a hydrogen atom, further preferably an alkyl group having 1 to 4 carbon atoms or a hydrogen atom. Specific examples of such a substituent include a methyl group, an ethyl group, a propyl group, an isopropyl group, a butyl group, an isobutyl group, a sec-butyl group, a tert-butyl group, a pentyl group, a 1-methyl butyl group, a 2-methyl butyl group, a 3-methyl butyl group, a 1-ethyl propyl group, a 2-ethyl propyl group, a 1,1-dimethyl propyl group, a 1,2-dimethyl propyl group, a 2,2-dimethyl propyl group, a vinyl group, a 1-methyl vinyl group, a 1-ethyl vinyl group, a 1-propyl vinyl group, a 2-methyl vinyl group, a 2-ethyl vinyl group, a 2-propyl vinyl group, a phenyl group, a benzyl group, a p-methoxy benzyl group, a p-dimethylamino benzyl group, a p-hydroxybenzyl group, a phenethyl group, a diphenyl methyl group, a tolyl group, an o-xylyl group, a cyclopropyl group, a cyclobutyl group, a cyclopentyl group, and a cyclohexyl group. Among these, in order to exert the operational effects by the present invention more effectively and reliably, a methyl group, an ethyl group, a propyl group, an isopropyl group, a butyl group, an isobutyl group, a sec-butyl group, a tert-butyl group, a 1-methyl butyl group, a 2-methyl butyl group, a 3-methyl butyl group, a vinyl group, a 1-methyl vinyl group, a 1-ethyl vinyl group, a 2-methyl vinyl group, and a 2-ethyl vinyl group are preferable, and a methyl group, an ethyl group, a propyl group, an isopropyl group, a n-butyl group, an isobutyl group, a sec-butyl group, a tert-butyl group, a vinyl group, a 1-methyl vinyl group, a 1-ethyl vinyl group, a 2-methyl vinyl group, and a 2-ethyl vinyl group are more preferable.

Specifically, examples of the compound represented by formula (2) above of this embodiment include ethylideneaminoguanidine salt, propylideneaminoguanidine salt, butylideneaminoguanidine salt, 3-methylbutylideneaminoguanidine salt, 1-methylethylideneaminoguanidine salt, 1-methylpropylideneaminoguanidine salt, 1-methylbutylideneaminoguanidine salt, 1-ethylpropylideneaminoguanidine salt, 1-isopropyl-2-methylpropylideneaminoguanidine salt, pentylideneaminoguanidine salt, 1,3-dimethylbutylideneaminoguanidine salt, 1,2-dimethylpropylideneaminoguanidine salt, 1-methylbutylideneaminoguanidine salt, 1-methylpentylideneaminoguanidine salt, 2-methylpropylideneaminoguanidine salt, 1-methylhexylideneaminoguanidine salt, arylideneaminoguanidine salt, 2-methylarylideneaminoguanidine salt, 2-butenylideneaminoguanidine salt, 2,6-dimethyl-4-heptylideneaminoguanidine salt, 2-furylmethylideneaminoguanidine salt, benzylideneaminoguanidine salt, 4-dimethylaminophenylmethyleneaminoguanidine salt, 4-methoxyphenylmethyleneaminoguanidine salt, 4-hydroxyphenylmethyleneaminoguanidine salt, 1-phenylethylideneaminoguanidine salt, 1-methyl-3-phenylarylideneaminoguanidine salt, diphenylmethyleneaminoguanidine salt, and 1-(2,4-dihydroxyphenyl)benzylideneaminoguanidine salt. Among these, preferable examples include compounds represented by formulae (5), (6), (7), (8), (9), (10), and (11) below.

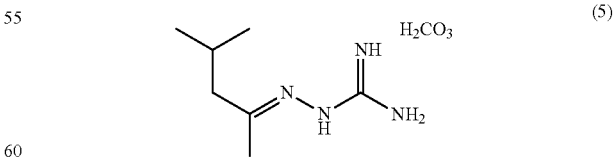

(5)

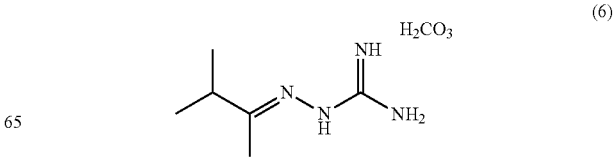

(6)

-continued

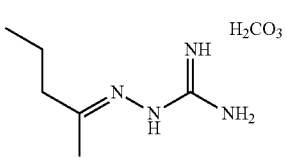
(7)

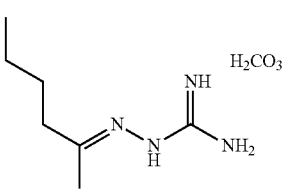
(8)

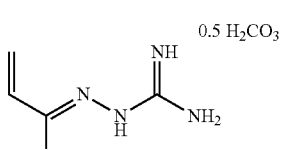
(9)

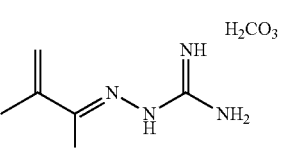
(10)

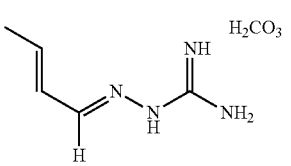
(11)

The compound represented by formula (2) above can be obtained by a known method and can be produced by a method according to International Publication No. 2015/190504, for example. The compounds represented by formula (2) above may be used singly, or in combinations of two or more thereof.

In formula (3) above, X is an acid that forms a salt together with a guanidine moiety. The acid is an acid that can form a salt together with a guanidine moiety, and the types thereof are not limited. Examples of the acid that can form a salt together with a guanidine moiety include organic acids such as acetic acid, oxalic acid, and phenyl phosphinic acid; and inorganic acids such as hydrochloric acid, sulfuric acid, carbonic acid, nitric acid, phosphoric acid, hydrobromic acid, hydriodic acid, hydrobromic acid, sulfamic acid, perchloric acid, silicic acid, and boric acid. Among these, hydrochloric acid, sulfuric acid, carbonic acid, and nitric acid, with which guanidine salts as raw material compounds are easily commercial available, are preferable, and carbonic acid is more preferable because of the ease of purification during production. The acids may be used singly, or in combinations of two or more thereof.

The compound represented by formula (3) above has strong basicity, since positive charges of conjugate acids are stabilized by resonance due to a plurality of nitrogen atoms present in the molecule, and the compound is normally present as a composite (salt) with an acid. The compound represented by formula (3) above is not specifically limited, and examples thereof include 1,3-diaminoguanidine hydrochloride, 1,3-diaminoguanidine hydroiodide, 1,3-diaminoguanidine hydrobromide, 1,3-diaminoguanidine sulfate, 1,3-diaminoguanidine nitrate, 1,3-diaminoguanidine oxalate, 1,3-diaminoguanidine phosphate, 1,3-diaminoguanidine carbonate, 1,3-diaminoguanidine acetate, 1,3-diaminoguanidine sulfamate, 1,3-diaminoguanidine perchlorate, 1,3-diaminoguanidine silicate, 1,3-diaminoguanidine borate, and 1,3-diaminoguanidine phenylphosphinate. Among these, 1,3-diaminoguanidine hydrochloride, 1,3-diaminoguanidine sulfate, 1,3-diaminoguanidine carbonate, and 1,3-diaminoguanidine nitrate, which are easily commercially available, are preferable, and 1,3-diaminoguanidine hydrochloride and 1,3-diaminoguanidine carbonate are preferable because of the ease of purification during production.

The compound represented by formula (3) above can be obtained by a known method, or a commercially available product may be used. The compounds represented by formula (3) above may be used singly, or in combinations of two or more thereof.

The amount of the aminoguanidines used is preferably 0.01 mass or more and 10 mass % or less, more preferably 0.1 mass % or more and 3.0 mass % or less, further preferably 0.2 mass % or more and 2.0 mass % or less, particularly preferably 0.3 mass % or more and 1.0 mass % or less, based on the total amount (100 mass %) of the rubber component.

A kneader used in the first kneading step is not specifically limited, and examples thereof include a Labo Prastomill, a Banbury mixer, an intensive mixer, an internal mixer, a roller, a kneader ruder, a twin screw extruder, and a mixing roll.

Further, the kneading conditions in the first kneading step are not specifically limited, but the kneading temperature (the temperature of each material in the kneader) is generally preferably 80° C. or more and 200° C. or less, more preferably 110° C. or more and 180° C. or less. In order to exert the operational effects by the present invention more effectively and reliably, the maximum temperature in the kneader in the first kneading step is preferably 120° C. or more and 190° C. or less, more preferably 130° C. or more and 170° C. or less, further preferably 140° C. or more and 160° C. or less. From the same viewpoint, the temperature in the kneader when adding the aminoguanidines in the first kneading step is preferably 140° C. or less, further preferably 110° C. or less. Meanwhile, the temperature in the kneader when adding the aminoguanidines may be 5° C. or more, 10° C. or more, or 15° C. or more.

Further, the order of the materials to be put into the kneader is not specifically limited, and all the materials may be put into the kneader at a time and mixed, followed by kneading, for example. Alternatively, each material may be put into the kneader at a different timing. In this case, another material is further added to the mixture or kneaded mixture of materials that have been already put therein. Further, the method for putting the respective materials is not specifically limited, and examples thereof include putting solid or powder materials as they are, putting the materials dispersed in a dispersion medium as a suspension, and putting the materials dissolved in a solvent as a solution or emulsion.

Further, the kneading time and the rotational speed of the mixer are not specifically limited as long as the compounded components can be mixed uniformly, and the kneading time and the rotational speed of the mixer may be appropriately determined depending on the kneader used. In view of the production efficiency, the kneading time is preferably 1 minute or more and 10 minutes or less, more preferably 2 minutes or more and 7 minutes or less. In the case of natural rubbers, the molecular weight tends to decrease with the kneading, and therefore the conditions are set to give a desired molecular weight.

In the second kneading step, sulfur and a vulcanization accelerator are added to the kneaded mixture obtained by the first kneading step, followed by kneading, to obtain an unvulcanized rubber composition.

The sulfur is used as a vulcanizing agent, and sulfur commonly used in the art can be appropriately used therefor. The amount of the vulcanizing agent containing sulfur used is preferably 0.1 part by mass or more and 5.0 parts by mass or less, more preferably 0.5 part by mass or more and 3.0 parts by mass or less, based on 100 parts by mass of the rubber component. When the amount of the vulcanizing agent containing sulfur used is 0.1 part by mass or more, further sufficient vulcanization tends to be achieved. Further, when the content of the vulcanizing agent containing sulfur is 5.0 parts by mass or less, a so-called scorch time is shortened, and suppression of rubber burning during the kneading tends to be enabled. Further, the ratio of sulfur in the vulcanizing agent is preferably 50 mass % or more and 100 mass % or less, more preferably 75 mass % or more and 100 mass % or less, further preferably 90 mass % or more and 100 mass % or less, further more preferably 95 mass % or more and 100 mass % or less, particularly preferably 98 mass % or more and 100 mass % or less, based on the total amount (100 mass %) of the vulcanizing agent.

The type of the vulcanization accelerator is not specifically limited, and examples thereof include thiazole compounds such as mercaptobenzothiazole and 2,2'-dibenzothiazolyl disulfide; sulfenamide compounds such as N-cyclohexyl-2-benzothiazolylsulfenamide, N,N'-dicyclohexyl-2-benzothiazolylsulfenamide, and N'-tert-butyl-2-benzothiazolylsulfenamide; thiuram compounds such as tetramethylthiuram disulfide, tetraacetylthiuram disulfide, tetrabutylthiuram disulfide, and tetrabenzylthiuram disulfide; and guanidine compounds such as diphenylguanidine. These vulcanization accelerators may be used singly, or in combinations of two or more thereof. The amount used is preferably 0.1 parts by mass or more and 5.0 parts by mass or less, based on 100 parts by mass of the rubber component.

A kneader used in the second kneading step is not specifically limited and may be the same as the kneader used in the first kneading step. Examples of the kneader include a Labo Prastomill, a Banbury mixer, an intensive mixer, an internal mixer, a roller, a kneader ruder, a twin screw extruder, and a mixing roll.

Further, the kneading conditions in the second kneading step are not specifically limited, but in order to suppress the increase in viscosity of the unvulcanized rubber composition with the progress of crosslinking, the kneading temperature (the temperature of the kneaded mixture in the kneader) is preferably 40° C. or more and 100° C. or less, more preferably 45° C. or more and 100° C. or less, further preferably 50° C. or more and 100° C. or less. Further, the kneading temperature may be 60° C. or more and 90° C. or less. Further, the kneading time is not specifically limited, but is preferably 1 minute or more and 10 minutes or less, more preferably 2 minutes or more and 8 minutes or less, in view of the production efficiency.

In the vulcanization step, the unvulcanized rubber composition is vulcanized, to obtain a vulcanized rubber composition having a glass transition temperature of −30° C. or more and 0° C. or less. The temperature (the temperature of the rubber composition) in the vulcanization step is not specifically limited but is preferably 120° C. or more and 200° C. or less. Further, in the vulcanization step, the pressure applied to the unvulcanized rubber composition is not specifically limited, and a pressure ranging from the normal pressure to pressurized conditions may be applied thereto. The pressure when producing a vulcanized rubber sheet is defined as 3.5 MPa or more in JISK6299:2012, and therefore the pressure may be for appropriately determined with reference to this condition. The vulcanization time in the vulcanization step may be appropriately determined with reference to the time that is determined as the 90% vulcanization time (t90) of the unvulcanized rubber composition obtained in the second kneading step according to JISK6300-2:2001. In view of the reversion (particularly, in the case of compounding natural rubbers), the vulcanization time is preferably set to be longer than t90 by 5 minutes to 10 minutes.

In this embodiment, the glass transition temperature of the vulcanized rubber composition (which will be hereinafter also referred to simply as "Tg") is −30° C. or more and 0° C. or less, preferably −20° C. or more and −5° C. or less. When Tg is adjusted to fall within the aforementioned range, the loss tangent at 0° C. of the vulcanized rubber composition can be enhanced, and the loss tangent at 60° C. can be reduced. The reason for this is considered as follows, but not limited to the following. Specifically, Tg is equivalent to the temperature at which the value of the loss tangent is maximum (i.e. the peak top) when the loss tangent of the vulcanized rubber composition is plotted with respect to the measured temperature. When Tg is −30° C. or more, the loss tangent in the region at higher temperature than Tg is enhanced, as compared with the case of less than −30° C. Meanwhile, when Tg is 0° C. or less, the loss tangent in the region at higher temperature than Tg is reduced, as compared with the case of over 0° C. Further, the aforementioned aminoguanidines are added, followed by kneading, in the first kneading step, thereby further enhancing the loss tangent around Tg, and reducing the loss tangent at a temperature on the high temperature side away from Tg. As a result of these, the loss tangent at 0° C. increases, and the loss tangent at 60° C. decreases as well.

The glass transition temperature of the vulcanized rubber composition largely depends on the glass transition temperature of the rubber component compounded therein. Therefore, in order to adjust the glass transition temperature of the vulcanized rubber composition to −30° C. or more and 0° C. or less, it is desirable to select a rubber component such that the glass transition temperature of the rubber composition is −30° C. or more and 0° C. or less. Further, the glass transition temperature can be optionally adjusted by using another rubber component having a different glass transition temperature in combination as the rubber component contained in the vulcanized rubber composition. Further, the glass transition temperature can be shifted to the high temperature side by increasing the amount of the vulcanizing agent (crosslinking agent) used, which is typified by sulfur, in the vulcanized rubber composition. Further, the glass transition temperature of the vulcanized rubber composition can be enhanced by compounding thermoplastic resins such as C5 resins, C5 to C9 resins, C9 resins, terpene resins, terpene-aromatic compound resins, rosin resins, dicyclopentadiene resins, and alkyl phenolic resins.

In the method for producing a vulcanized rubber composition of this embodiment, a compounding ingredient that is commonly used in the rubber industry can be appropriately used, in addition to the aforementioned materials. Such a compounding ingredient is not specifically limited, and examples thereof include an anti-aging agent, a softener, a vulcanization accelerator aid, and a vulcanizing agent other than sulfur. One or more of these compounding ingredients can be appropriately selected to be compounded into the vulcanized rubber composition of this embodiment as long as they do not disturb the objects of this embodiment. Commercially available products can be suitably used as these compounding ingredients.

The type of the anti-aging agent is not specifically limited, and examples thereof include anti-aging agents based on naphthyl amine, p-phenylenediamine, hydroquinone derivatives, bis-, tris-, polyphenols, diphenylamine, quinoline, monophenol, thiobisphenol, and hindered phenol. Among these, for further enhancing the anti-aging effect, amine-based anti-aging agents such as those based on p-phenylenediamine and diphenylamine are preferable. The diphenylamine-based anti-aging agents are not specifically limited, and examples thereof include 4,4'-bis($\alpha$-methylbenzyl)diphenylamine, 4,4'-bis($\alpha$,$\alpha$-dimethylbenzyl)diphenylamine, p-(p-toluenesulfonylamide)diphenylamine, and di(4-octylphenyl)amine. Among these, for further enhancing the anti-aging effect, 4,4'-bis($\alpha$-methylbenzyl)diphenylamine is more preferable. Further, the p-phenylenediamine-based anti-aging agents are not specifically limited, and examples thereof include N,N'-diphenyl-p-phenylenediamine, N-isopropyl-N'-phenyl-p-phenylenediamine, N,N'-di-2-naphthyl-p-phenylenediamine, N-cyclohexyl-N'-phenyl-p-phenylenediamine, N-phenyl-N'-(3-methacryloyloxy-2-hydroxypropyl)-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, and N-(1,3-dimethylbutyl)-N'-phenyl-p-phenylenediamine. Among these, for further enhancing the anti-aging effect and reducing the cost, N-(1,3-dimethylbutyl)-N'-phenyl-p-phenylenediamine is more preferable. The amount of the anti-aging agent used is preferably 0.1 mass % or more and 5.0 mass % or less, based on 100 mass % of the rubber component. The anti-aging agents may be used singly, or in combinations of two or more thereof.

The type of the softener is not specifically limited, and examples thereof include mineral oil softeners derived from petroleum and coal tar; vegetable oil softeners derived from fat oil and pine tree; and synthetic resin softeners. Further, the vulcanization accelerator aid is not specifically limited, and examples thereof include stearic acid. Further, the type of the vulcanizing agent other than sulfur is not specifically limited, and any vulcanizing agent commonly used in the art can be appropriately used, including peroxides.

The respective components contained in the vulcanized rubber composition of this embodiment and the content thereof are the same as the respective materials and the amount used in the method for producing a vulcanized rubber composition, and therefore detailed descriptions thereof are omitted herein.

The vulcanized rubber composition of this embodiment is preferably used as a material of tires, since it can reduce the rolling resistance of the tires while enhancing the wet grip performance and further exerts a tire-reinforcing effect. In particular, the aforementioned vulcanized rubber composition is preferably used for treads of tires. A tire in which the aforementioned rubber composition is used for treads has excellent low fuel consumption. The tire of this embodiment is not particularly limited except that the aforementioned rubber composition is used for any one of tires and can be produced according to a conventional method. Further, as a gas with which the tire is filled, inert gases such as nitrogen, argon, and helium can be used other than the normal air or air with oxygen partial pressure adjusted.

EXAMPLES

Hereinafter, the present invention will be described further in detail by way of examples, but the present invention is not limited to these examples.

Example 1

Kneading was carried out according to the composition shown in Table 1, using a Labo Prastomill (manufactured by Toyo Seiki Seisaku-sho, Ltd.).
(First Kneading Step (Kneading Step (A)))
137.5 phr of a solution-polymerized styrene butadiene rubber (product name "TUFDENE3835" manufactured by Asahi Kasei Corporation) was put into the Labo Prastomill with its inside varying from 70° C. to 100° C., and then 1.0 phr of aminoguanidine carbonate (manufactured by Tokyo Chemical Industry Co., Ltd.), 3.0 phr of zinc oxide (manufactured by Wako Pure Chemical Industries, Ltd.), 2.0 phr of stearic acid (manufactured by Wako Pure Chemical Industries, Ltd.), 80 phr of silica (product name "ULTRASIL7000GR" manufactured by EVONIK JAPAN, CTAB surface area=160 m$^2$/g), and 6.4 phr of a silane coupling agent (bis(3-triethoxysilylpropyl) tetrasulfide, manufactured by EVONIK JAPAN) were put therein, followed by kneading to a kneading temperature of 150° C. (maximum temperature), to obtain a kneaded mixture. Thereafter, the kneaded mixture was discharged from the Labo Prastomill, followed by cooling to room temperature.
(Second Kneading Step (Kneading Step (B)))
Thereafter, the kneaded mixture was put into a mixer heated to 53° C., and then 1.5 phr of sulfur (manufactured by Hosoi Chemical Industry Co., Ltd., average particle size: 250 μm), 2.0 phr of CBS (N-cyclohexyl-2-benzothiazolylsulfenamide, manufactured by Wako Pure Chemical Industries, Ltd.) as a vulcanization accelerator, and 2.0 phr of DPG (diphenylguanidine, manufactured by Wako Pure Chemical Industries, Ltd.) were put into the mixer, followed by kneading for 3 minutes, to prepare an unvulcanized rubber composition.
(Vulcanization Step)
Subsequently, using a press machine (manufactured by KITAGAWA SEIKI Co., Ltd.), the unvulcanized rubber composition was vulcanized for 20 minutes under the conditions of 160° C. and 10 MPa, to obtain a vulcanized rubber composition.

Example 2

An unvulcanized rubber composition was prepared according to the composition in Table 1 by the same operation as in Example 1, except that the amount of the silane coupling agent (bis(3-triethoxysilylpropyl) tetrasulfide) compounded was changed to 4.8 phr, to obtain a vulcanized rubber composition.

Example 3

An unvulcanized rubber composition was prepared according to the composition in Table 1 by the same operation as in Example 1, except that the amount of the silane coupling agent (bis(3-triethoxysilylpropyl) tetrasulfide) compounded was changed to 8.0 phr, to obtain a vulcanized rubber composition.

Comparative Example 1

An unvulcanized rubber composition was prepared according to the composition in Table 1 by the same operation as in Example 1, except that aminoguanidine carbonate was not used, to obtain a vulcanized rubber composition.

Comparative Example 2

An unvulcanized rubber composition was prepared according to the composition in Table 1 by the same operation as in Example 1, except that aminoguanidine carbonate was not used and the amount of the silane coupling agent (bis(3-triethoxysilylpropyl) tetrasulfide) compounded was changed to 4.8 phr, to obtain a vulcanized rubber composition.

Comparative Example 3

An unvulcanized rubber composition was prepared according to the composition in Table 1 by the same operation as in Example 1, except that aminoguanidine carbonate was not used and that the compounding amount of the silane coupling agent (bis(3-triethoxysilylpropyl) tetrasulfide) was changed to 8.0 phr, to obtain a vulcanized rubber composition.

Comparative Example 4

Using the Labo Prastomill with the inside of the mixer heated to 30° C. without using the solution-polymerized styrene butadiene rubber (product name "TUFDENE3835" manufactured by Asahi Kasei Corporation), natural rubber coagulum (RSS#1, manufactured by Kato Sansho Co., Ltd.) was masticated for 5 minutes. According to the composition in Table 1, 100.5 phr of the natural rubber after the mastication was used, the amount of silica compounded was changed to 50 phr, the amount of the silane coupling agent (bis(3-triethoxysilylpropyl) tetrasulfide) compounded was changed to 3.0 phr, the amount of sulfur compounded was changed to 1.8 phr, the amount of the vulcanization accelerator (CBS) compounded was changed to 1.0 phr, and the amount of the vulcanization accelerator (DPG) compounded was changed to 0.50 phr. Further, the vulcanization conditions using the press machine was changed to 145° C., 10 MPa, and 30 minutes. Except for the above, an unvulcanized rubber composition was prepared by the same operation as in Example 1, to obtain a vulcanized rubber composition.

Comparative Example 5

Using the Labo Prastomill with the inside of the mixer heated to 30° C. without using the solution-polymerized styrene butadiene rubber (product name "TUFDENE3835" manufactured by Asahi Kasei Corporation) and aminoguanidine carbonate, natural rubber coagulum (RSS#1) was masticated for 5 minutes. According to the composition in Table 1, 100 phr of the natural rubber after the mastication was used, the amount of silica compounded was changed to 50 phr, the amount of the silane coupling agent (bis(3-triethoxysilylpropyl) tetrasulfide) compounded was changed to 3.0 phr, the amount of sulfur compounded was changed to 1.8 phr, the amount of the vulcanization accelerator (CBS) compounded was changed to 1.0 phr, and the amount of the vulcanization accelerator (DPG) compounded was changed to 0.50 phr. Further, the vulcanization conditions using the press machine was changed to 145° C., 10 MPa, and 30 minutes. Other than above, an unvulcanized rubber composition was prepared by the same operation as in Example 1, to obtain a vulcanized rubber composition.

Using the obtained vulcanized rubber compositions, the glass transition temperature Tg was measured by the following method, to evaluate the exothermic properties, the wet grip properties, and the reinforcing properties. Table 1 shows the results.

(1) Glass Transition Temperature Tg

For the aforementioned vulcanized rubber compositions, the storage elastic modulus (E'), the loss elastic modulus (E"), and the loss tangent (tan δ) were measured, using a dynamic mechanical analyzer (model name "DMS6100" manufactured by Seiko Instruments Inc.), under the conditions of a temperature of −50° C. to −80° C., a distortion of 0.5%, and a frequency of 10 Hz. A temperature corresponding to the tan δ peak was calculated from the obtained temperature-tan δ curve as a glass transition temperature Tg.

(2) Exothermic Properties

For the aforementioned vulcanized rubber compositions, the storage elastic modulus (E'), the loss elastic modulus (E"), and the loss tangent (tan δ) were measured, using a dynamic mechanical analyzer (model name "DMS6100" manufactured by Seiko Instruments Inc.), under the conditions of a temperature of 60° C., a distortion of 0.5%, and a frequency of 10 Hz. Each value was shown as an index value, with the value of the loss tangent of Comparative Example 1 being taken as 100. A smaller index value indicates a smaller hysteresis loss and lower exothermic properties.

(3) Wet Grip Properties

For the aforementioned vulcanized rubber compositions, the storage elastic modulus (E'), the loss elastic modulus (E"), and the loss tangent (tan δ) were measured, using a dynamic mechanical analyzer (model name "DMS6100" manufactured by Seiko Instruments Inc.), under the conditions of a temperature of 0° C., a distortion of 0.5%, and a frequency of 10 Hz. Each value was shown as an index value, with the value of the loss tangent of Comparative Example 1 being taken as 100. A larger index value indicates more excellent wet grip performance.

(4) Reinforcing Properties

A tensile test was performed on the aforementioned vulcanized rubber compositions, using an autograph (model name "AGS-X" manufactured by SHIMADZU CORPORATION) according to JIS K6251:2010, to measure the tensile stress. While the stress applied when the test piece was stretched to an elongation of 100% was taken as M100, and the stress applied when the test piece was stretched to an elongation of 300% was taken as M300, the value of M300/M100 was calculated, to indicates each value as an index value with the value of Comparative Example 1 being taken as 100. A larger index value indicates more excellent reinforcing properties.

TABLE 1

|  |  |  |  | Example 1 | Example 2 | Example 3 | Comparative Example 1 |
|---|---|---|---|---|---|---|---|
| Kneading step (A) | Styrene butadiene |  | phr | 137.5 | 137.5 | 137.5 | 137.5 |

TABLE 1-continued

|  |  |  |  |  |  |  |
|---|---|---|---|---|---|---|
|  | rubber |  |  |  |  |  |
|  | Natural rubber | phr | 0 | 0 | 0 | 0 |
|  | Aminoguanidine carbonate | phr | 1.0 | 1.0 | 1.0 | 0 |
|  | Stearic acid | phr | 2.0 | 2.0 | 2.0 | 2.0 |
|  | Zinc oxide | phr | 3.0 | 3.0 | 3.0 | 3.0 |
|  | Silica | phr | 80 | 80 | 80 | 80 |
|  | Silane coupling agent | phr | 6.4 | 4.8 | 8.0 | 6.4 |
| Kneading step (B) | Sulfur | phr | 1.5 | 1.5 | 1.5 | 1.5 |
|  | Vulcanization accelerator (CBS) | phr | 2.0 | 2.0 | 2.0 | 2.0 |
|  | Vulcanization accelerator (DPG) | phr | 2.0 | 2.0 | 2.0 | 2.0 |
| Evaluation | Tg | deg. C. | −15.6 | −16.3 | −14.3 | −16.0 |
|  | Exothermic properties |  | 93 | 101 | 104 | 100 |
|  | Wet grip properties |  | 105 | 108 | 124 | 100 |
|  | Reinforcing properties |  | 102 | 105 | 102 | 100 |

|  |  |  | Comparative Example 2 | Comparative Example 3 | Comparative Example 4 | Comparative Example 5 |
|---|---|---|---|---|---|---|
| Kneading step (A) | Styrene butadiene rubber | phr | 137.5 | 137.5 | 0 | 0 |
|  | Natural rubber | phr | 0 | 0 | 100.0 | 100.0 |
|  | Aminoguanidine carbonate | phr | 0 | 0 | 1.0 | 0 |
|  | Stearic acid | phr | 2.0 | 2.0 | 2.0 | 2.0 |
|  | Zinc oxide | phr | 3.0 | 3.0 | 3.0 | 3.0 |
|  | Silica | phr | 80 | 80 | 50 | 50 |
|  | Silane coupling agent | phr | 4.8 | 8.0 | 3.0 | 3.0 |
| Kneading step (B) | Sulfur | phr | 1.5 | 1.5 | 1.8 | 1.8 |
|  | Vulcanization accelerator (CBS) | phr | 2.0 | 2.0 | 1.0 | 1.0 |
|  | Vulcanization accelerator (DPG) | phr | 2.0 | 2.0 | 0.50 | 0.50 |
| Evaluation | Tg | deg. C. | −16.6 | −14.6 | −44.4 | −44.7 |
|  | Exothermic properties |  | 108 | 109 | 46 | 73 |
|  | Wet grip properties |  | 107 | 113 | 23 | 28 |
|  | Reinforcing properties |  | 97 | 99 | 112 | 98 |

It can be said from the results shown in Table 1 that Examples 1 to 3 in which the Tg of the vulcanized rubber composition was −30° C. or more and 0° C. or less and to which aminoguanidines were added are rubber compositions having high loss tangent at 0° C., excellent wet grip properties, low loss tangent at 60° C., excellent exothermic properties, and excellent reinforcing properties, as compared with Comparative Examples 1 to 3 to which aminoguanidines were not added and Comparative Examples 4 to 5 in which the Tg was less than −30° C.

INDUSTRIAL APPLICABILITY

According to the present invention, the loss tangent at 0° C. of a vulcanized rubber composition that contains a natural rubber and/or a synthetic rubber, an inorganic filler, and a silane coupling agent can be enhanced, and the loss tangent at 60° C. thereof can be reduced. Accordingly, the present invention is industrially applicable in the fields in which such effects are required, such as the field of tires.

The invention claimed is:

1. A method for producing a vulcanized rubber composition, comprising:

a first kneading step of obtaining a kneaded mixture comprising: a rubber component comprising at least one selected from the group consisting of natural rubbers and synthetic rubbers, a filler comprising an inorganic filler, and a sulfur-containing silane coupling agent;

a second kneading step of adding sulfur and a vulcanization accelerator to the kneaded mixture, followed by kneading, to thereby obtain an unvulcanized rubber composition; and a vulcanization step of vulcanizing the unvulcanized rubber composition to thereby obtain a vulcanized rubber composition having a glass transition temperature of −30° C. or more and 0° C. or less, wherein at least one selected from the group consisting of compounds represented by formulae (1), (2), and (3) below is added, followed by kneading, in the first kneading step:

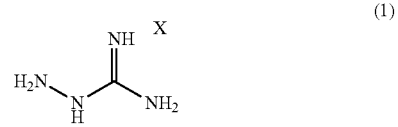

(1)

wherein X is an acid that forms a salt together with a guanidine moiety;

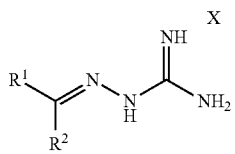
(2)

wherein X is an acid that forms a salt together with a guanidine moiety, $R^1$ and $R^2$ are each independently any one selected from the group consisting of a hydrogen atom and an alkyl group, a cycloalkyl group, an aryl group, an alkyl aryl group, and an alkenyl group which have 1 to 18 carbon atoms, these groups each optionally having one or more substituents containing at least one selected from the group consisting of a sulfur atom, a nitrogen atom, and an oxygen atom; and

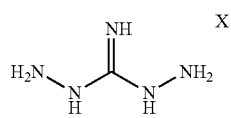
(3)

wherein X is an acid that forms a salt together with a guanidine moiety.

2. The method for producing a vulcanized rubber composition according to claim 1, wherein
the inorganic filler comprises silica.

3. The method for producing a vulcanized rubber composition according to claim 1, wherein
the maximum temperature in the first kneading step is 120° C. or more and 190° C. or less.

4. The method for producing a vulcanized rubber composition according to claim 1, wherein
the temperature when adding at least one selected from the group consisting of the compounds represented by formulae (1), (2), and (3) above in the first kneading step is 120° C. or less.

5. A vulcanized rubber composition comprising:
a rubber component comprising at least one selected from the group consisting of natural rubbers and synthetic rubbers;
an inorganic filler;
a sulfur-containing silane coupling agent;
at least one selected from the group consisting of compounds represented by formulae (1), (2), and (3) below;
sulfur; and
a vulcanization accelerator;
wherein the vulcanized rubber composition has a glass transition temperature of −30° C. or more and 0° C. or less:

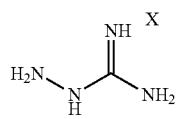
(1)

wherein X is an acid that forms a salt together with a guanidine moiety;

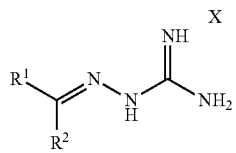
(2)

wherein X is an acid that forms a salt together with a guanidine moiety, $R^1$ and $R^2$ are each independently any one selected from the group consisting of a hydrogen atom and an alkyl group, a cycloalkyl group, an aryl group, an alkyl aryl group, and an alkenyl group which have 1 to 18 carbon atoms, these groups each optionally having one or more substituents containing at least one selected from the group consisting of a sulfur atom, a nitrogen atom, and an oxygen atom; and

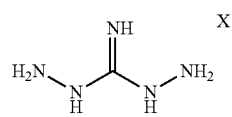
(3)

wherein X is an acid that forms a salt together with a guanidine moiety.

6. The vulcanized rubber composition according to claim 5, wherein the inorganic filler comprises silica.

7. The method for producing a vulcanized rubber composition according to claim 2, wherein
the maximum temperature in the first kneading step is 120° C. or more and 190° C. or less.

8. The method for producing a vulcanized rubber composition according to claim 2, wherein
the temperature when adding at least one selected from the group consisting of the compounds represented by formulae (1), (2), and (3) above in the first kneading step is 120° C. or less.

9. The method for producing a vulcanized rubber composition according to claim 3, wherein
the temperature when adding at least one selected from the group consisting of the compounds represented by formulae (1), (2), and (3) above in the first kneading step is 120° C. or less.

10. The method for producing a vulcanized rubber composition according to claim 7, wherein
the temperature when adding at least one selected from the group consisting of the compounds represented by formulae (1), (2), and (3) above in the first kneading step is 120° C. or less.

* * * * *